United States Patent
Stoia et al.

(10) Patent No.: US 9,815,203 B1
(45) Date of Patent: Nov. 14, 2017

(54) METHODS AND SYSTEMS FOR ADJUSTING OPERATION OF A ROBOTIC DEVICE BASED ON DETECTED SOUNDS

(71) Applicant: X Development LLC, Mountain View, CA (US)

(72) Inventors: Laura Stoia, Mountain View, CA (US); Craig Latimer, Palo Alto, CA (US); Matthieu Guilbert, Palo Alto, CA (US)

(73) Assignee: X Development LLC, Mountain View, CA (US)

( * ) Notice: Subject to any disclaimer, the term of this patent is extended or adjusted under 35 U.S.C. 154(b) by 121 days.

(21) Appl. No.: 14/833,811

(22) Filed: Aug. 24, 2015

(51) Int. Cl.
  G05B 15/00 (2006.01)
  G05B 19/00 (2006.01)
  B25J 9/16 (2006.01)

(52) U.S. Cl.
  CPC ........... *B25J 9/1694* (2013.01); *B25J 9/1674* (2013.01); *B25J 9/1697* (2013.01); *B25J 9/1671* (2013.01); *B25J 9/1689* (2013.01)

(58) Field of Classification Search
  CPC ...... B25J 9/1694; B25J 9/1674; B25J 9/1697; B25J 9/1671; B25J 9/163; B25J 9/1689; G01H 3/08; H01L 21/67288; H04R 29/001; G05B 23/0229; G11B 15/6835; G11B 17/225
  See application file for complete search history.

(56) References Cited

U.S. PATENT DOCUMENTS

| 6,026,686 | A | 2/2000 | Hattori et al. |
| 7,277,247 | B2 | 10/2007 | Hoshino |
| 7,324,909 | B2 | 1/2008 | Yasukawa et al. |
| 7,647,827 | B2 | 1/2010 | Pelecanos et al. |
| 8,074,499 | B2 | 12/2011 | Kinzie et al. |
| 8,791,714 | B2 | 7/2014 | Hansen |
| 8,799,258 | B2 | 8/2014 | Mule |
| 8,918,343 | B2 | 12/2014 | Mitchell |
| 2002/0184755 | A1* | 12/2002 | Suhara ............... H05K 13/0069 29/833 |
| 2005/0036036 | A1* | 2/2005 | Stevenson ........ G08B 13/19608 348/211.99 |

(Continued)

FOREIGN PATENT DOCUMENTS

KR   20120116313 A   * 10/2012

*Primary Examiner* — Rachid Bendidi
(74) *Attorney, Agent, or Firm* — McDonnell Boehnen Hulbert & Berghoff LLP

(57) ABSTRACT

An example method includes determining an expected sound profile corresponding to a given task for a robotic device. The method further includes detecting a sound profile during execution of the given task by the robotic device. The method also includes determining one or more differences in amplitude for at least one frequency range between the detected sound profile and the expected sound profile corresponding to the given task for the robotic device. In response to determining the one or more differences in amplitude for the at least one frequency range between the detected sound profile and the expected sound profile, the method additionally includes identifying at least one component of the robotic device associated with the detected sound profile during execution of the given task. The method further includes adjusting control data for the at least one component of the robotic device.

16 Claims, 7 Drawing Sheets

(56) References Cited

U.S. PATENT DOCUMENTS

| | | | |
|---|---|---|---|
| 2008/0002832 A1* | 1/2008 | Chen | G01H 3/08 381/56 |
| 2012/0123737 A1* | 5/2012 | Hansen | G05B 23/0229 702/183 |

* cited by examiner

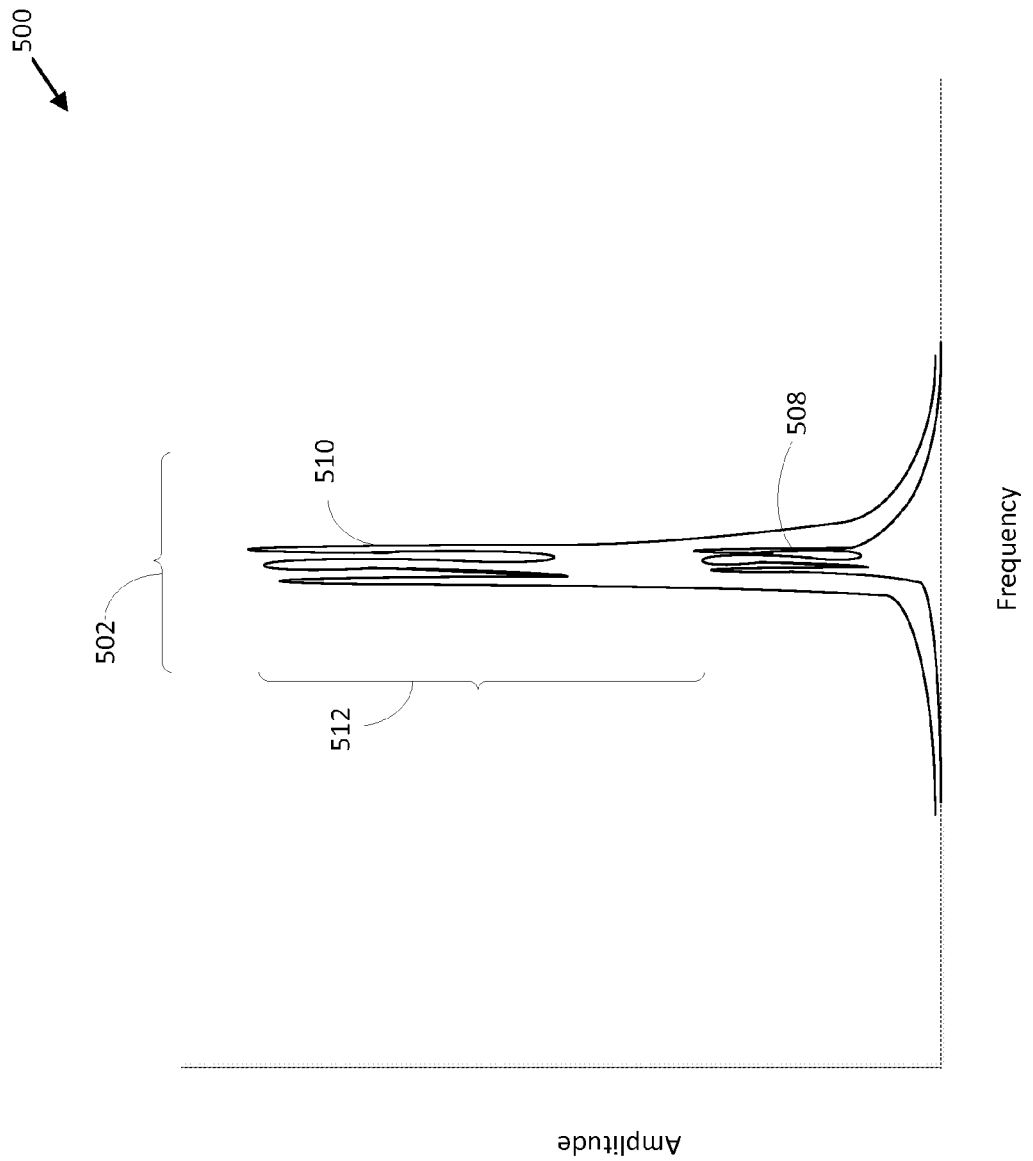

METHODS AND SYSTEMS FOR ADJUSTING OPERATION OF A ROBOTIC DEVICE BASED ON DETECTED SOUNDS

BACKGROUND

Robotic systems may be used for applications involving material handling, welding, assembly, and dispensing, among others. Over time, the manner in which these robotic systems operate is becoming more intelligent, more efficient, and more intuitive. As robotic systems become increasingly prevalent in numerous aspects of modern life, the need for robotic systems that can operate alongside and interface with humans becomes apparent. Therefore, a demand for such robotic systems has helped open up a field of innovation in actuators, sensing techniques, controllers, as well as component design and assembly.

SUMMARY

In one example, a method is provided that includes determining an expected sound profile corresponding to a given task for a robotic device. The method also includes detecting, based on sensor data from at least one audio sensor associated with the robotic device, a sound profile during execution of the given task by the robotic device. The method also includes determining one or more differences in amplitude for at least one frequency range between the detected sound profile and the expected sound profile corresponding to the given task for the robotic device. In response to determining the one or more differences in amplitude for the at least one frequency range between the detected sound profile and the expected sound profile corresponding to the given task for the robotic device, the method also includes identifying at least one component of the robotic device associated with the detected sound profile during execution of the given task. The method also includes adjusting control data for the at least one component of the robotic device.

In another example, a non-transitory computer-readable medium is disclosed having stored thereon program instructions that when executed by a computing device, cause the computing device to perform functions. The functions include determining an expected sound profile corresponding to a given task for a robotic device. The functions also include detecting, based on sensor data from at least one audio sensor associated with the robotic device, a sound profile during execution of the given task by the robotic device. The functions also include determining one or more differences in amplitude for at least one frequency range between the detected sound profile and the expected sound profile corresponding to the given task for the robotic device. In response to determining the one or more differences in amplitude for the at least one frequency range between the expected sound profile and the expected sound profile, the functions further include identifying at least one component of the robotic device associated with the detected sound profile during execution of the given task. The functions also includes adjusting control data for the at least one component of the robotic device.

In another example, a robotic device is provided that includes one or more audio sensors, where the one or more audio sensors are configured to detect sounds associated with operation of the robotic device. The robotic device also includes one or more processors and data storage comprising instructions executable by the one or more processors to cause the robotic device to perform operations. The operations include determining an expected sound profile corresponding to a given task for a robotic device. The operations also include detecting, based on sensor data from the one or more audio sensors, a sound profile during execution of the given task by the robotic device. The operations also include determining one or more differences in amplitude for at least one frequency range between the detected sound profile and the expected sound profile corresponding to the given task for the robotic device. In response to determining the one or more differences in amplitude for the at least one frequency range between the detected sound profile and the expected sound profile corresponding to the given task for the robotic device, the operations further include identifying at least one component of the robotic device associated with the detected sound profile during execution of the given task. The operations also include adjusting control data for the at least one component of the robotic device.

In another example, a system is provided that includes a means for determining an expected sound profile corresponding to a given task for a robotic device. The system also includes means for detecting, based on sensor data from at least one audio sensor associated with the robotic device, a sound profile during execution of the given task by the robotic device. The system also includes means for determining one or more differences in amplitude for at least one frequency range between the detected sound profile and the expected sound profile corresponding to the given task for the robotic device. In response to determining the one or more differences in amplitude for the at least one frequency range between the detected sound profile and the expected sound profile corresponding to the given task for the robotic device, the system also includes means for identifying at least one component of the robotic device associated with the detected sound profile during execution of the given task. The system also includes means for adjusting control data for the at least one component of the robotic device.

These as well as other aspects, advantages, and alternatives, will become apparent to those of ordinary skill in the art by reading the following detailed description, with reference where appropriate to the accompanying figures.

BRIEF DESCRIPTION OF THE FIGURES

FIG. 5 illustrates an example representation of an expected sound profile and detected sound profile over a frequency domain during a given task of a robotic device, according to an example embodiment.

DETAILED DESCRIPTION

Figure 1:
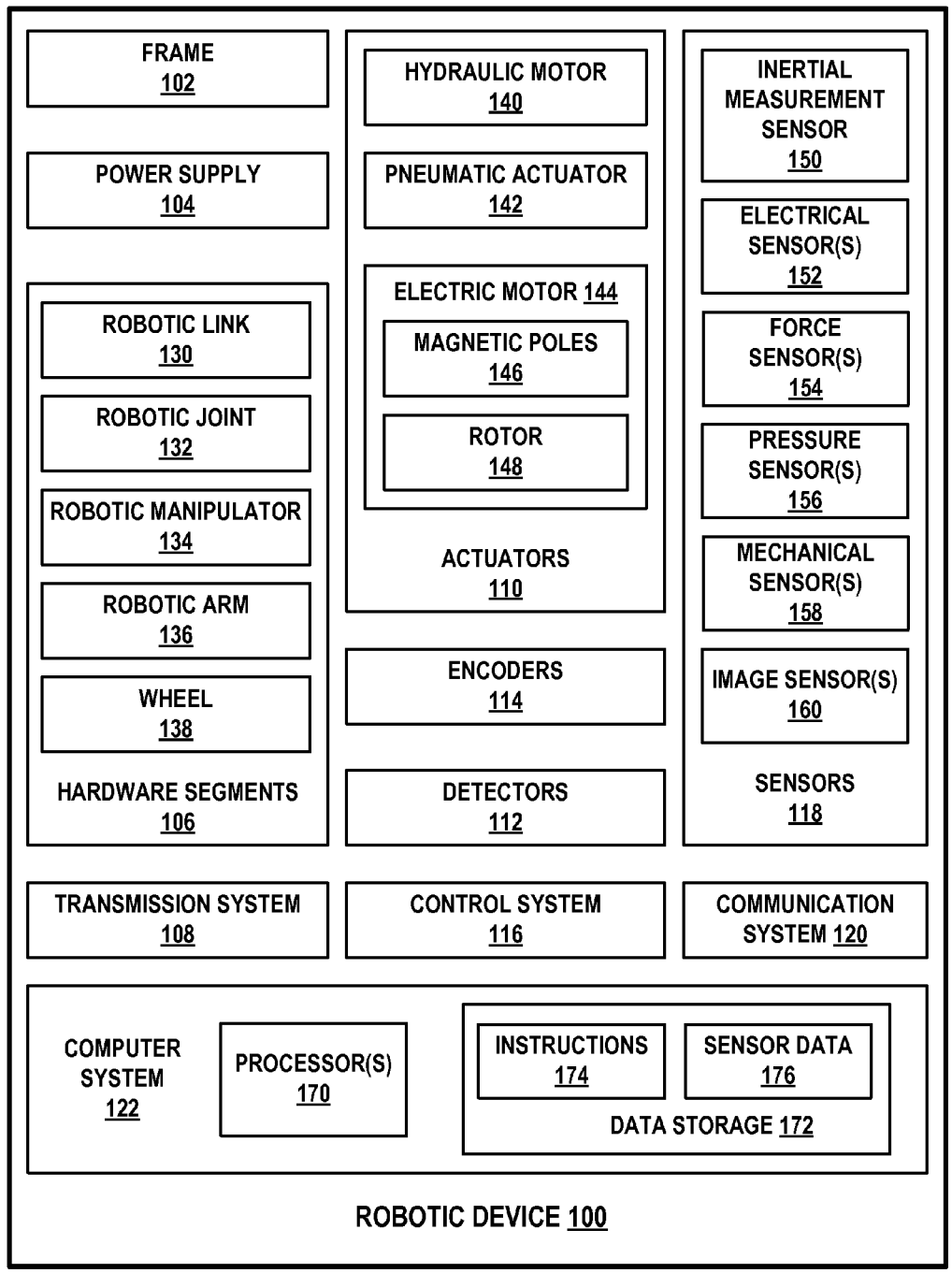
FIG. 1 is a block diagram of a robotic device, according to an example embodiment.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Within examples, a robotic device, such as a manufacturing robot or a consumer robot, may be configured to adapt its behavior based on detected sounds. For instance, the robotic device can learn how walking, or picking up a particular type of object, or using a certain tool typically sounds by aggregating sound data over a number of executions of the tasks. The robot may then identify differences in sounds detected during future performances of the same tasks. When differences in detected sounds are identified during execution of a particular task, the robotic device may adjust its behavior. For instance, the robotic device may adjust the force applied by a gripper or recalibrate a sensor in response to detecting unexpected sounds during the performance of particular tasks.

In one scenario, the robotic device may be instructed to perform an operation involving the assembly of a vehicle door. In this scenario, the robotic device may be configured to move the vehicle door to a predetermined location in order to assist with the production of vehicles. While the robotic device is performing the operation associated with the vehicle door, one or more microphones attached to the robotic device and/or positioned nearby may listen for unexpected sounds during the operation.

In some examples, error identification may be beneficial to the individuals responsible for work completed by the robotic device. Analyzing detected sounds in view of expected sounds may help troubleshoot multiple errors during various operations of the robotic device. For example, the microphone may detect a sound with an amplitude of 15 decibels (dB) within a particular frequency range of 5 to 7 Hz during execution of a given task. In this example, the amplitude of the detected sound within the particular frequency range may differ from an expected amplitude (e.g., by more than a predetermined threshold amount).

In further examples, the detected sound may be used to identify a particular component of the robotic device that is causing an error. Additionally, once the particular component has been identified, control data associated with the particular component of the robotic device may be adjusted in view of the detected sound. In one example, the current associated with a motor driving a belt transmission of the robotic device may be adjusted to determine if operation of a particular belt of the gearbox is causing the detected sound. Other examples associated with other components of the robotic device are possible as well. Some example methods provide a way to adjust control data associated with operation of a robotic device based on sensor data from at least one audio sensor.

Within examples, one or more computing devices may be provided that are configured to determine an expected sound profile of a given task for a robotic device. In some examples, the expected sound profile for one or more tasks may be generated during a sound learning phase. During the sound learning phase, sounds may be recorded during the execution of a task by the robot. The recorded sounds may be encoded in a particular format (e.g., wavelets over a frequency domain) for comparison with sounds detected during future performances of the task. In some examples, the expected sound profile for a given task may be determined by combining (e.g., averaging) recorded sound data for many executions of the given task by the robot and/or by other similar robots.

In some examples, the expected sound profile may include an amplitude of sound in at least one frequency range over a time domain. For instance, the expected sound profile may indicate sounds the robot expects to hear at different points in time over a 20 second timeline during execution of a task that takes on average 20 seconds to complete. In other examples, the expected sound profile includes one or more wavelets over a frequency domain. The wavelets may indicate amplitude or loudness of sounds detected within different frequency ranges during performance of task. In such examples, the expected sound profile may be independent of particular times when sounds were detected, which may be beneficial for certain types of robot tasks for which time correlation may be difficult.

In additional examples, the expected sound profile may also include a plurality of different expected sounds that correspond to a plurality of different material types. By way of example, the plurality of material types may include plastic, glass, aluminum, wood, etc. For instance, if the robotic device detects a sound associated with a plastic object and the robotic device was operating with the belief that the object was a different material type, then the robotic device may adjust the force applied by a gripper to ensure that the robotic device does not damage the object based on a strength associated with the different material type.

During performance of a given task, a detected sound profile may be encoded and compared to the expected sound profile for the task. In particular, difference in amplitude for at least one frequency range of sound between the detected sound profile and the expected sound profile for the task may be identified. In some examples, the detected sound profile may be recorded as amplitudes of sounds within particular frequency ranges over a time domain. In such examples, the beginning of the task may be timestamped, the ending of the task may be timestamped, and any sounds occurring between the beginning and ending of the task may be recorded. The expected sound profile and detected sound profile may then be compared by comparing amplitudes of sound within certain frequency ranges at particular times during a timeline. For instance, the system may determine an amplitude (i.e., 15 dB) of the detected sound exceeds an amplitude of an expected sound (i.e., 10 dB) associated with the task for more than five seconds. In other examples, the detected sound profile may be encoded as wavelets over a frequency domain. In such examples, the expected sound profile and the detected sound profile may be compared by comparing the average frequency domain and standard deviation over the duration of the task.

If one or more differences between the expected sound profile and detected sound profile are identified, robot operation may be adjusted. In some examples, adjustment of robot operation may only be triggered if the differences in amplitude at certain frequencies are greater than a predetermined threshold amount. In additional examples, this amount may be determined by experimentation for different types of tasks and/or robotic device. Based on detected differences between expected and detected sounds, at least one component of the robotic device may be identified that is associated with the detected sounds during the given operation. For example, the at least one component may be a sensor associated with image capture such as a charge-coupled device (CCD) image sensor. Data from the image sensor may be timestamped in order to correlate the data with detected sounds. In one instance, the image quality of an image captured by the CCD image sensor may be causing a misalignment between an end effector of the robotic device and an object. The misalignment may cause an unexpected sound that may be traced back to the imaging system. In this instance, one or more values that correspond to the image quality such as exposure or sharpness may then be adjusted to improve image capture.

Control data for different components of the robotic device may also be timestamped in order to associate particular control data (e.g., one or more values corresponding to torque, velocity, current, and voltage associated with a robotic arm) with detected sounds. Adjustments in the control data may then be made in order to account for unexpected sounds. In some examples, one or more adjustments in robot operation may be made during the performance of task. In other examples, the adjustments may be made after completion of the task (e.g., before performing the task again).

Referring now to the Figures, FIG. 1 is a simplified block diagram of a robotic device 100, according to an example embodiment. As shown, the robotic device 100 includes a frame 102, a power supply 104, hardware segments 106, a transmission system 108, actuators 110, detectors 112, encoders 114, a control system 116, sensors 118, a communication system 120, and a computer system 122. In other embodiments, the robotic device 100 may include more, fewer, or different components, and each component may include more, fewer, or different sub-components. Additionally, the components and sub-components shown may be combined or divided in any number of ways.

The frame 102 may be configured to support the various components of the robotic device 100. For example, the frame 102 may include aluminum, titanium, other metal/metal-alloy, plastic, composite, wood, or any other solid material having shape and material characteristics to support the components of the robotic device 100.

The power supply 104 may be configured to provide power to some or all of the components of the robotic device 100. To this end, the power supply 104 may include, for example, a rechargeable lithium-ion or lead-acid battery. In some embodiments, one or more banks of batteries may be configured to provide electrical power. Other power supply materials and configurations are possible as well, such as non-rechargeable batteries, etc. For example, the power supply 104 may include a source of energy that powers some or all the components of the robotic device 100. Example sources of energy may include gasoline, diesel, propane, other compressed gas-based fuels, ethanol, solar panels, batteries, or any other sources of energy. Further, for example, the power supply 104 may include wired (e.g., power cable, usb cable, etc.) and/or wireless connectivity (e.g., energy-harvesting antenna, etc.) with an external source (e.g., wall outlet, other power outlet, radiating antenna, etc.) to receive the energy and provide the power to the various components of the robotic device 100. Additionally or alternatively, the power supply 104 may include a combination of fuel tanks, batteries, capacitors, flywheels, etc.

The plurality of moveable hardware segments 106 may include any combination of physical components that are actuated by the robotic device 100 to interact with an environment of the robotic device 100. As shown, the hardware segments 106 include a robotic link 130, a robotic joint 132, a robotic manipulator 134, a robotic arm 136, and a wheel 138. However, in some embodiments, the hardware segments 106 may include a different combination of segments. For instance, the hardware segments 106 may alternatively include three links, four joints, one manipulator, and no wheels. In other embodiments, the robotic device 100 may include more, fewer, or different components, and each component may include more, fewer, or different sub-components. In addition, the robotic device 100 may be configured to operate autonomously, semi-autonomously, and/or using instructions provided user(s), and may exist in various forms, such as a humanoid robot or a quadruped robot, among other examples. The robotic device 100 may be fixed within the environment, or may have one of a number of different types of mobile bases (e.g., different numbers of wheels). Furthermore, the robotic device 100 may also be referred to as a robotic device, mobile robot, or robot, among others.

Additionally, the components and sub-components shown may be combined or divided in any number of ways. Other combinations are possible as well.

The link 130 may be a rigid component of the robotic device 100 that has a particular shape. As such, the link 130 may include aluminum, titanium, other metal/metal-alloy, plastic, composite, wood, or any other solid material.

The joint 132 is a component of the robotic device 100 that allows a rotational and/or translational degree of freedom to the link 130. For instance, the joint 132 may be a round rotating structure connected to the link 130 to allow the link 130 to rotate about an axis of the joint 132.

The manipulator 134 may be a machine or robotic mechanism that allows the robotic device 100 to interact with various objects in the environment of the robotic device 100. For example, the manipulator 134 may include a series of segments such as the link 130 and the joint 132 that are configured to grasp and/or move objects in the environment of the robotic device 100, usually in several degrees of freedom. Alternatively, for example, the manipulator 134 may include an end-effector tool, such as a robotic wrist or a magnet, that is configured to manipulate the objects in the environment.

The arm 136 may include an interconnected set of links, joints and/or manipulators, such as the link 130, the joint 132, and/or the manipulator 134, to support or move an object through space.

The wheel 138 may include any type of wheel, such as a single wheel, double wheel, compound wheel, castor wheel, or any other wheel configured to rotate to move the robotic device 100 along a heading (e.g., steering direction) of the wheel 38. The wheel 138 may include one or more solid materials suitable for performing the function of the wheel 138 such as plastic, composite, metal, metal compound, etc. By way of example, a castor wheel may be configured to roll along a straight line path, or mounted on a pivot (e.g., swivel, etc.) such that the wheel 138 may align with a direction of travel. Additionally, in some examples, the wheel 138 may include an energy-absorbing material (e.g., rubber, etc.) to facilitate operation and/or maintenance of the wheel 138. For example, the wheel 138 may include a tire coupled to a rim of the wheel 138.

The transmission system 108 may be coupled to at least one of the hardware segments 106. In some examples, the transmission system 108 may include transmission components such as clutches, differentials, pulleys, cables, belts, drive shafts, and/or other elements. Additionally, transmission system 108 may be configured to change speed, torque, and direction of rotation of the hardware segments 106 relative to the actuators 110. Other examples are possible as well.

The plurality of actuators 110 may be configured to actuate the hardware segments 106 and/or to maintain positions of the hardware segments 106. As such, the actuators 110 may include any combination of actuators such as an electric motor, a steam motor, a sterling motor, a combustion motor, a hydraulic motor, a pneumatic motor, or any other actuator. In some examples, a given actuator may include multiple types of motors. For example, a gas-electric hybrid device may include a gasoline engine and an electric engine that are intermittently activated as the given actuator. Other examples are possible as well. As shown, the actuators 110 include a hydraulic motor 140, a pneumatic actuator 142, and an electric motor 144. However, in some embodiments, the actuators 110 may include a different number or combination of motors. For instance, the actuators 110 may alternatively include five electric motors only. Other combinations are possible as well.

The hydraulic motor 140 may include any mechanical actuator that converts hydraulic pressure and flow into torque and angular displacement (e.g., rotation). Example hydraulic motors include gear and vane motors, gerotor motors, axial plunger motors, radial piston motors, etc.

The pneumatic actuator 142 may include any actuator that converts energy in the form of a compressed fluid into mechanical motion. The mechanical motion may be rotary and/or linear, depending on the type of the pneumatic actuator 142. Example pneumatic actuators include tie rod cylinders, rotary pneumatic actuators, grippers, rodless pneumatic actuators, pneumatic artificial muscles, specialty actuators that combine rotary and linear motion, vacuum generators, etc.

The electric motor 144 may include any actuator that converts electrical energy into mechanical motion. For instance, the electric motor 144 may receive an electric current (e.g., AC current, DC current, etc.) from the power supply 104 and responsively provide the mechanical motion. To facilitate the energy conversion, an electric motor may operate according to various physical principles such as magnetic, electrostatic, piezoelectric, etc. As shown, the electrical motor 144 is of the magnetic variety. As such, the electric motor 144 includes a plurality of magnetic poles 146 arranged around a rotor 148. The magnetic poles 146, for example, may be formed as coils that are electronically switched by the robotic device 100. In turn, the rotor 148 may include a magnet or other material that is attracted/repelled towards one or more of the magnetic poles 146. The resulting motion of the rotor 148 may correspond to the mechanical motion that is caused by the electrical energy received by the magnetic poles 146. Other arrangements for the electric motor 144 are possible as well such as coreless motors, axial rotor motors, servo motors, stepper motors, linear motors, etc.

The detector(s) 112 may be configured to receive possible states of operation of the robotic device 100 and provide information indicative of the possible states of operation to one or more processors 170. In one example, the one or more processors 170 may be configured to receive information about an expected state of operation of the robotic device 100 and based on the received information, the one or more processors 170 may determine that the possible states of operation differ from the expected state of operation of the robotic device 100. In this example, based on a possible state of operation, the robotic device 100 may be instructed to begin powering down.

The encoders 114 may be coupled to the actuators 110 and configured to provide data indicative of motion and/or orientation of the actuators 110. For example, the encoders 114 may include a rotary encoder, a shaft encoder, or any other electro-mechanical device configured to convert an angular position/motion of a shaft of a given actuator to an analog or digital signal (e.g., the data, etc.). Various implementations are possible for the encoders 114 such as mechanical (e.g., metal disc containing a set of concentric rings of openings), optical (e.g., glass/plastic with transparent and opaque areas), magnetic (e.g., disc that includes a series of magnetic poles), capacitive (e.g., asymmetrical shaped disc rotated within the encoder to adjust capacitance between two electrodes), or any other implementation.

In some examples, the data provided by the encoders 114 may indicate a change in a position (e.g., orientation) of a given actuator of the actuators 110. Further, for example, the encoders 114 may provide a signal (e.g., index pulse, etc.) indicative of the given actuator being at a particular orientation. Further, in some examples, the data provided by the encoders 114 may be processed by the robotic device 100 to determine speeds of the actuators 110. For example, a time measurement may be obtained by the robotic device 100 in addition to the data from the encoders 114 to determine the speeds of the actuators 110.

Accordingly, in some examples, the encoders 114 may include an incremental encoder configured to provide the data indicative of motion of the actuators 110. In these examples, the robotic device 100 may cause actuators 110 to actuate one or more of the hardware segments 106, until the signal (e.g., index pulse, etc.) of the encoders 114 is detected to determine the particular orientations of the actuators 110.

Additionally or alternatively, in some examples, the encoders 114 may include an absolute encoder configured to provide the data. The absolute encoder, for example, may be configured to detect motion of the actuators 110 even if the absolute encoder is not provided with power. In these examples, the encoders 114 may provide the data indicative of the orientations of the actuators 110 without the robotic device 100 actuating the hardware segments 106 until the signal (e.g., index pulse) is received from the encoders 114.

The control system 116 may be configured to control operation of the robotic device 100 and/or components thereof. For instance, the control system 116 may include any combination of mechanisms configured to control the hardware segments 106. For example, the robotic device 100 may be an assembly line robot, and the control system 116 may control the robotic arm 136 to move an object from one location to another.

In some examples, the control system 116 may be implemented as a control loop that receives inputs from the detectors 112 and encoders 114 and provides output signals to control power provided to the actuators 110 to achieve a particular speed of motion of the hardware segments 106. Example control loops may include open loops, closed loops, etc. For example, the control system 116 may be implemented as proportional-integral-derivative (PID) controller. Other examples are possible as well. Thus, for example, the control system 116 may be configured to measure and/or control electric signals in the actuators 110. The control system 116 may additionally or alternatively include components other than those shown in FIG. 1.

The sensor(s) 118 may include a number of sensors configured to sense information about an environment in which the robotic device 100 is located, as well as sensing components in the robotic device 100. Further, in some examples, the sensors 118 may include one or more audio sensors. The one or more audio sensors may be configured to detect sounds associated with operation of the robotic device 100. As shown, the sensors of the sensor system 204 include an inertial measurement sensor (IMS) 150, one or more electrical sensors 152, one or more force sensors 154, one or more pressure sensors 156, one or more mechanical sensors 158, and one or more image sensors 160. The sensors 118 may include additional sensors as well, including, for example, sensors that monitor internal systems of the robotic device 100 (e.g., an $O_2$ monitor, a fuel gauge, a temperature monitor, etc.). Other sensors are possible as well.

The IMS 150 may be any combination of sensors configured to sense position and orientation changes of the robotic device 100 or components thereof based on inertial acceleration. In some embodiments, the combination of sensors may include, for example, accelerometers and gyroscopes. Other combinations of sensors are possible as well.

The electrical sensor(s) 152 may be any sensor configured to determine electrical properties associated with various components of the robotic device 100 (e.g., electric motor 144). For example, the electrical sensor 152 may include a current sensor (e.g., using electric current), a voltage detector (e.g., using voltage), or any other electrical sensor capable of measuring a voltage and/or current.

The force sensor(s) 154 may include any combination of sensors configured to measure force at various parts of the robotic device 100. For example, the force sensors 154 may include a force gauge, spring scale, strain gauge, load cell, load pin, or any other force sensor. The force sensors 154 may be arranged in various parts of the robotic device 100 to measure forces along the robotic device 100, and provide an indication of the forces to the robotic device 100. For example, a strain gauge may be placed between the robotic link 130 and the robotic joint 132 to measure the force between the two components. Further, in some examples, the force sensors 154 may be configured to measure a weight of one or more of the components in the robotic device 100. In one scenario, the robotic device 100 may adjust a position of a given segment to an upright position, and an associated force sensor may thus measure the weight of the given segment.

The pressure sensor(s) 156 may include any combination of sensors configured to measure pressure at various parts of the robotic device 100. For example, the pressure sensors 156 may include absolute pressure sensors, gauge pressure sensors, vacuum pressure sensors, differential pressure sensors, sealed pressure sensors, etc. The pressure sensors 156 may be arranged in various parts of the robotic device 100 to measure various pressures. For example, the pressure sensors 156 may measure pressure of fluid in the hydraulic motor 140, or pressure at an interface between two of the hardware segments 106, among other possibilities.

The mechanical sensor(s) 158 may include any combination of sensors configured to measure mechanical properties associated with the robotic device 100. By way of example, the mechanical sensors 158 may include one or more torque sensors for measuring a torque of the transmission system 108. In one scenario, the mechanical power is determined according to a torque sensor coupled to the transmission system 108 and an encoder 114 associated with a hardware segment of the hardware segments 106 of the robotic device 100.

The image sensor(s) 160 may include any combination of sensors configured to assist with image capture during a given operation of the robotic device 100. The image sensors 160 may include any types of optical sensors, such as charge-coupled device (CCD) image sensors, complementary metal-oxide-semiconductor (CMOS) image sensors, or other types of sensors configured to convert an optical image into an electronic signal. By way of example, the image sensors 160 may be a red/green/blue (RGB) infrared (IR) camera. Additionally, the image sensors 160 may also be a RGB camera. The RGB IR camera(s) or RGB camera(s) may be global shutter cameras, such that the pixels of a particular camera store information at the same time.

In some instances, one or any combination of the image sensors may be coupled to the hardware segments 106, such as the robotic arm 136. In another instance, the image sensors 160 may be configured to provide image data via communication system 120.

The communication system 120 may include a wired communication interface (e.g., parallel port, USB, etc.) and/or a wireless communication interface (e.g., antennae, transceivers, etc.) to receive and/or provide signals from/to external devices. In some examples, the communication system 120 may receive instructions for operation of the robotic device 100. Additionally or alternatively, in some examples, the communication system 120 may provide output data such as data from the encoders 114 and/or data from the sensors 118.

The computer system 122 includes one or more processors 170 and data storage 172. In some examples, some components of the computer system 122 may be distributed across multiple computing devices. For example, the data storage 172 may be included in an external data storage device communicatively linked with the robotic device 100. Other examples are possible as well. However, for the sake of example, the components are shown and described as part of the computer system 122.

The computer system 122 may be configured to transmit data to and receive data from one or more of the various components of the robotic device 100. To this end, the computer system 122 may be communicatively linked to one or more of the power supply 104, the actuators 110, the encoders 114, the control system 116, the sensors 118, and/or the communication system 120 by a system bus, network, and/or other connection mechanism (not shown in FIG. 1).

The computer system 122 may be further configured to interact with and control one or more hardware segments 106 of the robotic device 100. For example, the computer system 122 may be configured to provide instructions to the control system 116 to cause the actuators 110 to adjust positions of the hardware segments 106. As another example, the computer system 122 may be configured to provide instructions to the control system 116 to cause the electric motor 144 to no longer receive electrical power based on a given state of operation of the robotic device 100. Other examples are possible as well.

The processor(s) 170 may comprise one or more general-purpose processors and/or one or more special-purpose processors. To the extent the processor 170 includes more than one processor, such processors may work separately or in combination. For example, a first processor of the processor(s) 170 may operate the actuators 110, and a second processor of the processor(s) 170 may operate the sensors 118, etc. The data storage 172, in turn, may comprise one or more volatile and/or one or more non-volatile storage components, such as optical, magnetic, and/or organic storage, and the data storage 172 may be integrated in whole or in part with the processor 170.

In some embodiments, the data storage 172 may contain instructions 174 (e.g., program logic) executable by the processor 170 to perform various functions of the robotic device 100. The data storage 172 may contain additional instructions as well, including instructions to transmit data to, receive data from, interact with, and/or control one or more of the actuators 110, the encoders 114, the control system 116, the sensors 118, the detectors 112, and/or any other component of the robotic device 100. Although not illustrated in FIG. 1, the data storage 172 may store other data such as data collected by the encoders 114, the control system 116, and/or data from the sensors 118, etc. In one example, the data storage 172 may store sensor data 176. The sensor data 176 may be used to determine states of operation of the robotic device 100. The computer system 122 may additionally or alternatively include components other than those shown in FIG. 1.

Referring to FIG. 1, in some embodiments, one or more of the actuators 110, the encoders 114, the control system 116, the sensors 118, and the communication system 120 may be configured to work in an interconnected fashion with other components within and/or outside their respective systems. Further, the robotic device 100 may include one or more elements in addition to or instead of those shown. For example, the robotic device 100 may include one or more additional interfaces and/or power supplies. Other additional components are possible as well. In such embodiments, the data storage 172 may further include instructions (e.g., instructions 174, etc.) executable by the processor 170 to control and/or communicate with the additional components.

Still further, while each of the components and systems are shown to be integrated in the robotic device 100, in some embodiments, one or more components or systems may be removably mounted to or otherwise connected (e.g., mechanically or electrically) to the robotic device 100 using wired or wireless connections. The robotic device 100 may take other forms as well. Further, in some embodiments, the robotic device 100 may include more, fewer, or different components than those shown in FIG. 1.

Figure 2:
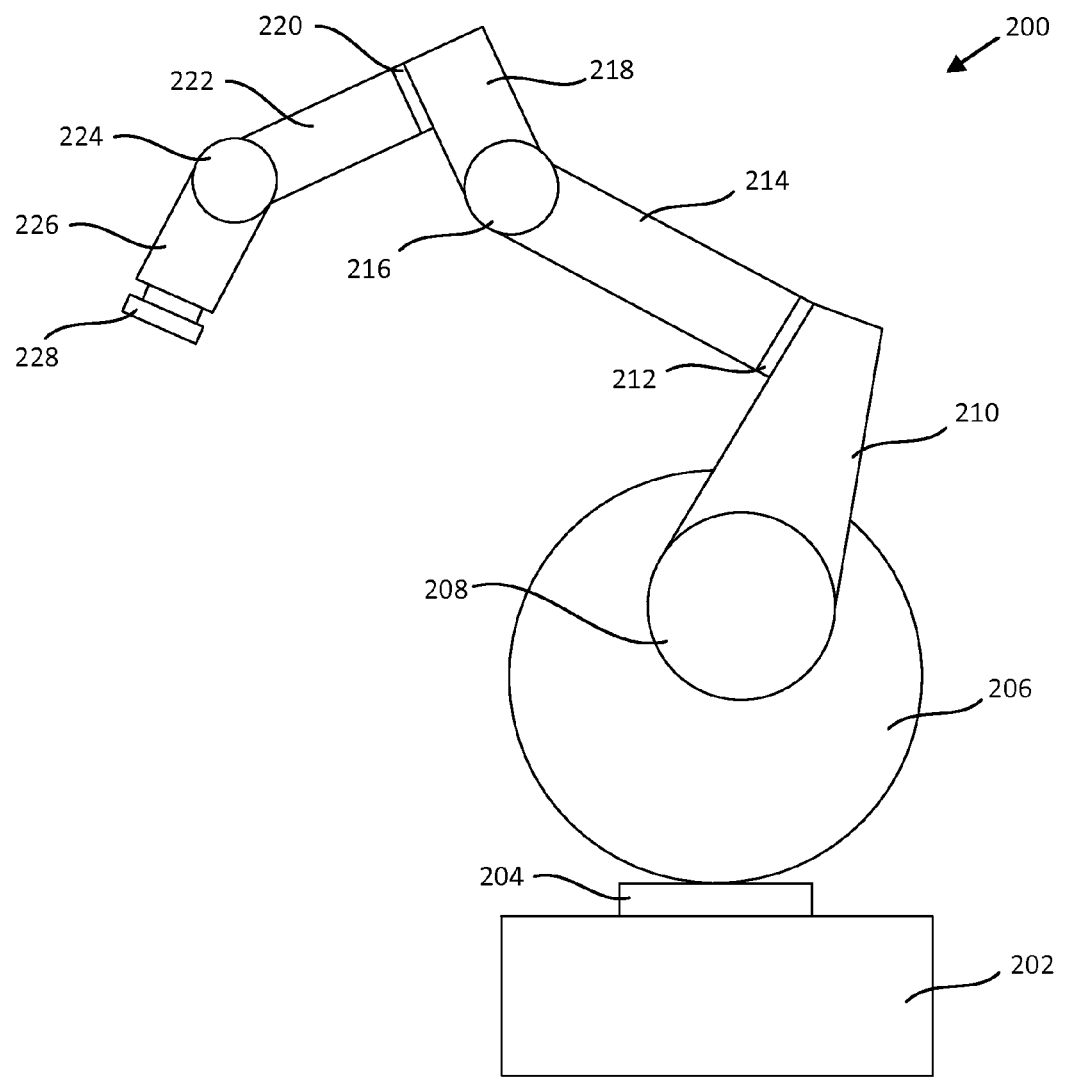
FIG. 2 illustrates a robotic device, according to an example embodiment.

FIG. 2 illustrates an example robotic device 200. The robotic device 200 may contain hardware, such as a processor, one or more computing devices, memory or storage, and sensors that enable the robotic device 200 to operate the robotic device 200 for use in assembly operations, pick and place work, spot welding, etc. The robotic device 200 may be powered by various means such as electric motors, pneumatic motors, hydraulic motors, etc. The robotic device 200 includes a base 202, links 206, 210, 214, 218, 222, and 226, joints 204, 208, 212, 216, 220, and 224, and manipulator 228.

The base 202 may provide a platform in order to provide support for the robotic device 200. The base 202 may be stationary or be coupled to wheels in order to provide movement of the robotic device 200. The base may comprise any number of materials such as aluminum, steel, stainless steel, etc., that may be suitable for a given environment associated with the robotic device 200.

The links 206, 210, 214, 218, 222, and 226 may be configured to be moved according to a programmable set of instructions. For instance, the links may be configured to follow a predetermined set of movements in order to accomplish a repetitive task over a period of time. By way of example, the links 206, 210, 214, 218, 222, and 226 may form a kinematic chain that defines relative movement of a given link of links 206, 210, 214, 218, 222, and 226 at a given joint of the joints 204, 208, 212, 216, 220, and 224.

The joints 204, 208, 212, 216, 220, and 224 may be configured to rotate through the use of a mechanical gear system. In one example, the mechanical gear system may be driven by a strain wave gearing, a cycloid drive, etc. The mechanical gear system selected would depend on a number of factors related to the operation of the robotic device 200 such as the length of the given link of the links 206, 210, 214, 218, 222, and 226, speed of rotation, desired gear reduction, etc. Providing power to the joints 204, 208, 212, 216, 220, and 224 will allow for the links 206, 210, 214, 218, 222, and 226 to be moved in a way that allows the manipulator 228 to interact with an environment.

In another example, the robotic device 200 may be configured to perform a predetermined motion according to a motion plan that results in link 222 rotating and link 206 remaining stationary. In the event that an unexpected external torque is applied to link 206 and thereby causing link 206 to move, then torque and velocity sensors will detect a power associated with the mechanical link and current and voltage sensors will detect a power associated with the electrical power generated from the motor. Based on signs of these detected powers, a given detector may provide information indicative of the possible state of operation associated with link 206 to one or more computing devices. In this example, based on a determination of an unexpected operation of the robotic device 200, the one or more computing devices may be configured to disable the electrical input associated with the robotic device 200.

The manipulator 228 may be configured to allow the robotic device 200 to interact the environment as shown in FIG. 2. In one example, the manipulator 228 may perform appropriate placement of an element through various operations such as lifting, maneuvering, and gripping etc. By way of example, the manipulator may be exchanged for another end effector that would provide the robotic device 200 with different functionality.

In further examples, the manipulator 228 may be a suction gripper, such as a digital suction grid gripper. In such embodiments, the gripper may include one or more suction valves that can be turned on or off either by remote sensing, or single point distance measurement and/or by detecting whether suction is achieved. In additional examples, the digital suction grid gripper may include an articulated extension. In some embodiments, the potential to actuate suction grippers with rheological fluids or powders may enable extra gripping on objects with high curvatures.

The robotic device 200 may be configured to operate according to a robot operating system (e.g., an operating system designed for specific functions of the robot). A robot operating system may provide libraries and tools (e.g., hardware abstraction, device drivers, visualizers, message-passing, package management, etc.) to enable robot applications.

Figure 3:
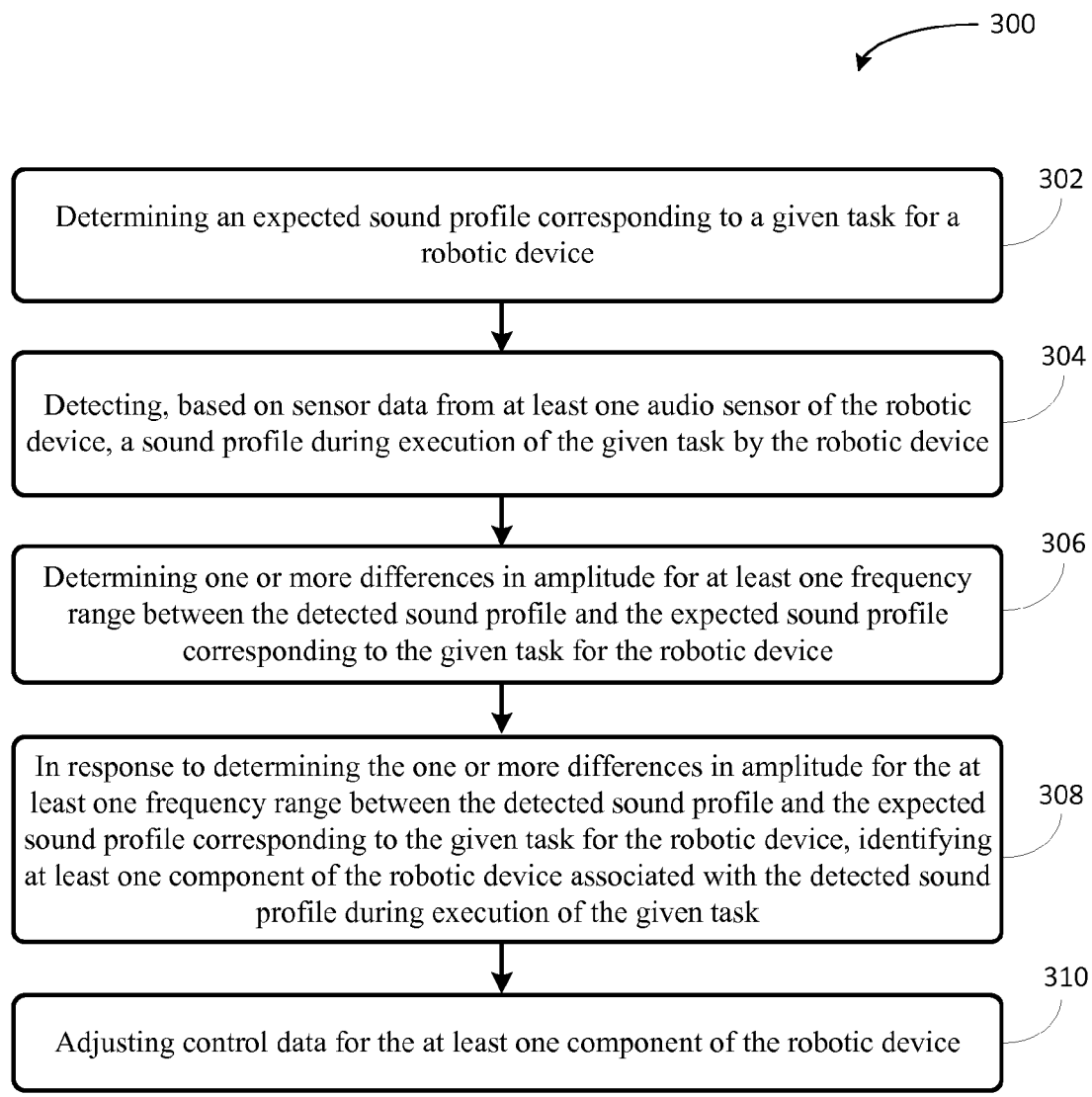
FIG. 3 is a block diagram of an example method for adjusting control data based on sound detection during operation of a robotic device, according to an example embodiment.

FIG. 3 is a block diagram of an example method for adjusting control data for a robotic device based on detected sounds during execution of a task, in accordance with at least some embodiments described herein. Method 300 may include one more operations, functions, or actions as illustrated by one or more of blocks 302-310. Although the blocks are illustrated in a sequential order, these blocks may in some instances be performed in parallel, and/or in a different order than those described therein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 300 and other processes and methods disclosed herein, each block in FIG. 3 may represent circuitry that is wired to perform the specific logical functions in the process. Illustrative methods, such as method 300, may be carried out in whole or in part by a component or components in the cloud and/or a robotic system, such as by the one or more of the components of the robotic device 100 shown in FIG. 1. However, it should be understood that example methods, such as method 300, may be carried out by other entities or combinations of entities (i.e., by other computing devices and/or combinations of computing devices), without departing from the scope of the invention.

For example, functions of the method 300 may be fully performed by a computing device (or components of a computing device such as one or more processors), or may be distributed across multiple components of the computing device, across multiple computing devices, and/or across a server. In some examples, the computing device may receive information from sensors of the robotic device, or where the computing device is a server the information can be received from another device that collects the information. As other examples, the method 300 may be performed by a computing device, by a server, or by a robotic device.

As shown by block 302, method 300 includes determining an expected sound profile corresponding to a given task for a robotic device. Within examples, the expected sound profile includes an amplitude of sound in at least one frequency range. For some example tasks, the expected sound profile may include expected amplitudes over a time domain. For instance, the expected sound profile may indicate sounds the robot expects to hear at different points in time over a timeline during performance of a task. In other examples, the expected sound profile includes one or more wavelets over a frequency domain. The wavelets may indicate amplitude or loudness or particular sounds detected within one or more frequency ranges during performance of task. Frequency correlation may be used instead of time correlation for certain types of robot tasks for which time correlation may be difficult.

In some examples, the expected sound profile may include sounds that correspond to various operations of the robotic device such as lifting a vehicle door, welding a vehicle frame, and installing a vehicle windshield. Each of those operations may have a different expected sound profile based on contact between a given manipulator of the robotic device and the material type associated with each object. For instance, a sound associated with the use of a suction gripper may be different from a sound associated with a tool for arc welding. The expected sound profile for different tasks may be continuously updated as the robotic device is instructed to perform new tasks.

The expected sound profile may be determined based on past operations of the robotic device. By way of example, the expected sound profile for certain tasks may be collected during an initial testing of the robotic device under ideal conditions. This would allow for a baseline to be established in order to also determine an acceptable threshold of operation associated with the expected sound. In another example, the plurality of expected sounds may be learned based on past operations of other robotic devices of the same type.

In one example, determining the expected sound profile may include receiving the expected sound profile for certain tasks of the robotic device from a cloud based remote server. The cloud based remote server may aggregate sounds recorded by other robots of the same type. This may allow a robotic device to be updated according to additional functionality associated with the robotic device in addition to facilitating an efficient manner of updating any number of robotic devices.

As shown by block 304, method 300 further includes detecting, based on sensor data from at least one audio sensor of the robotic device, a sound profile during execution of the given task by the robotic device. Within the examples, the detected sound profile may include amplitudes of one or more frequency ranges of sound recorded during performance of a task. In order to collect sensor data to determine the sound profile for a task, a starting point and ending point of the task may each be timestamped. Audio data may then be recorded between the starting and ending timestamp, and the recorded audio data may be processed to determine the detected sound profile.

In one scenario, an audio sensor of robotic device 200 may detect sound during movement of link 226 through the use of joint 224. In this scenario, the sensor data of the detected sound may be transmitted by the communication system 120 of robotic device 100 to a remote server for further processing. By way of example, the remote server may be configured to aggregate the sensor data of one or more robotic devices in order to build a database of detected sounds for a plurality of different tasks of the robotic device. In another scenario, the sensor data of the detected sound may be received by one or more processors 170 of the robotic device 100 for further processing.

As shown by block 306, method 300 includes determining one or more differences in amplitude for at least one frequency range between the detected sound profile and the expected sound profile corresponding to the given task for the robotic device. In some examples, this step may involve determining that detected amplitudes for one or more frequency ranges differ from expected amplitudes by more than a predetermined amount, which may be a learned amount for particular tasks. In additional examples, this step may involve determining that one or more frequency ranges of sounds are present in the detected sound profile, but not the expected sound profile. In further examples, this step may involve determining that one or more frequency ranges of sounds are present in the expected sound profile, but not the detected sound profile.

Figure 4:
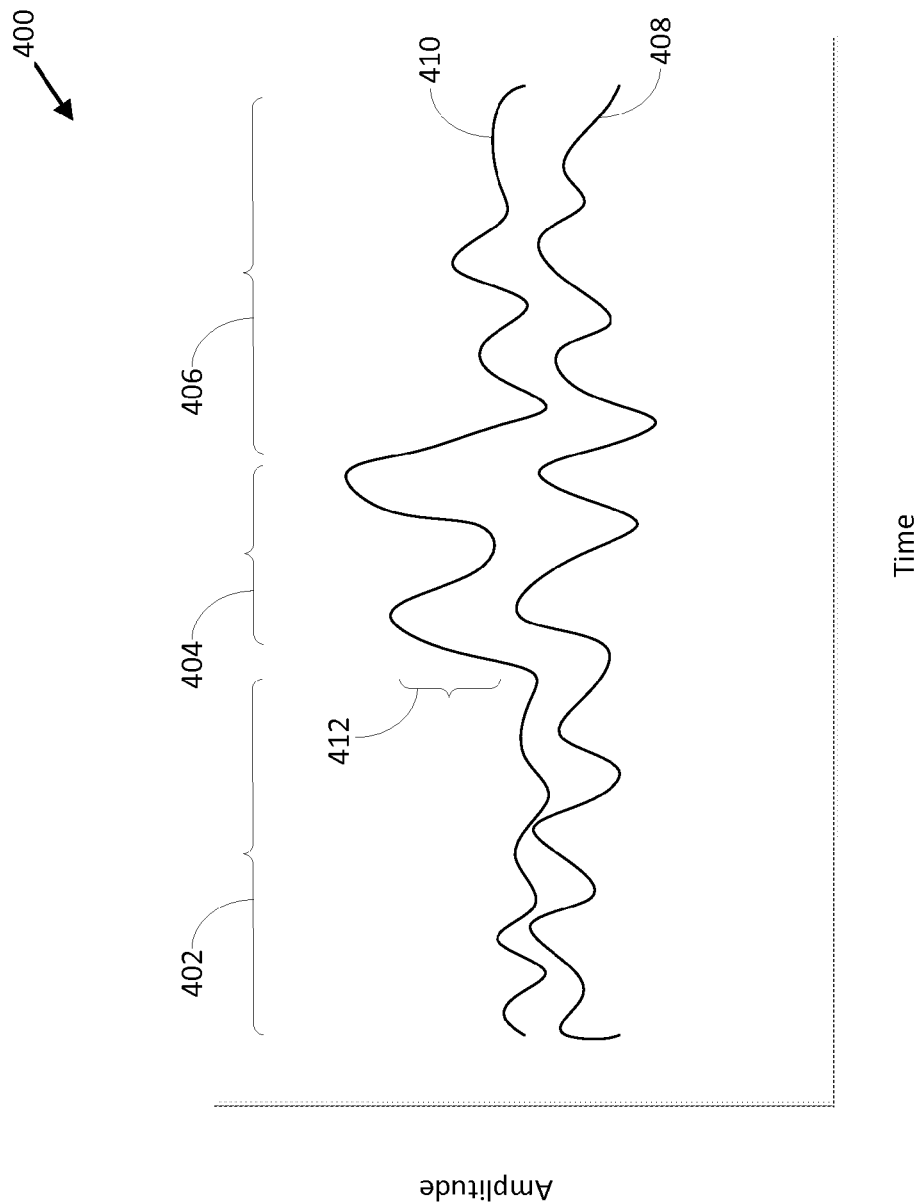
FIG. 4 illustrates an example representation of an expected sound profile and detected sound profile over a time domain during a given task of a robotic device, according to an example embodiment.

FIG. 4 illustrates an example representation 400 of an expected sound profile and a detected sound profile during execution of a given task by the robotic device. As shown in FIG. 4, the example representation 400 may be divided into a first period of time 402, a second period of time 404, and a third period of time 406. The example representation 400 includes expected sound profile 408, which includes expected amplitude of sound within a particular frequency range over a timeline during execution of a given task. The example representation 400 also includes detected sound profile 410, which includes detected amplitude of sound within the particular frequency range over the same timeline during execution of a given task during the given operation. As shown here, during the first period of time 402, the detected sound data may not differ from the expected sound data by more than a predetermined threshold amount 412.

By way of example, an unexpected error may occur during the second period of time 404. The unexpected error may cause a sound associated with larger amplitude than a sound within the first period of time 402. In this example, the difference in amplitude between detected sound profile 410 and expected sound profile 408 may exceed the threshold amount 412. As the robotic device progresses through the given operation, the detected sounds in the third period of time 406 may once again correlate to the expected sounds based on normal operation.

FIG. 5 illustrates another example representation 500 of an expected sound profile and a detected sound profile during execution of a given task by the robotic device. As shown in FIG. 5, the example representation 500 may include amplitudes of expected sound and detected sound within a particular frequency range. More specifically, an expected sound profile 508 and a detected sound profile 510 may have amplitudes that differ by amount 512 within frequency range 502. Comparing expected and detected sounds across a frequency domain rather than a time domain may be more appropriate for certain types of tasks that take a variable amount of time to complete by the robotic device.

By way of example, an unexpected error may occur at some point in time during execution of a particular task. The unexpected error may cause a sound associated with a higher amplitude within frequency range 502, as shown by detected sound profile 510. In this example, the difference 512 within amplitude between expected sound profile 508 and detected sound profile 510 within frequency range 502 may indicate an unexpected error in operation during performance of the task. For instance, the error may be identified by determining that the difference 512 in amplitude for frequency range 502 is greater than a predetermined threshold amount.

In some examples, the particular frequency range 502 and/or difference in amplitude 512 may be used to help diagnose the cause of the error, and/or how to adjust robot operation to compensate for the error. By way of example, the frequency ranges may vary according to a specific configuration of components of the robotic device. For instance, a robotic device that uses a belt transmission may have mechanical errors that correspond to a different frequency range than a robotic device that uses mechanical gears that are driven by a cycloid transmission.

Referring back to FIG. 3, as shown by block 308, in response to determining the one or more differences in amplitude for the at least one frequency range between the detected sound profile and the expected sound profile corresponding to the given task for the robotic device, identifying at least one component of the robotic device associated with the detected sound profile during execution of the given task. By way of example, the identified component associated with the detected sound profile may be a direct or indirect cause of the sound. If the component is a direct cause (e.g., an end effector hitting a glass object), it may be apparent from the operation how control of the component should be adjusted. If the component is an indirect cause (e.g., the vision system is not calibrated correctly which causes the suction gripper to be misaligned and thereby produces a particular sound), then additional processing may be performed to determine that the vision system is at fault. In that case, the expected sound profile may also include information about which components may be responsible for particular types of unexpected sounds.

In one instance, the identified component at fault may be an image sensor such as a camera coupled to the robotic device. In another instance, the identified component may be a belt of a belt transmission. The belt may produce a continuous sound that may serve to indicate the beginning of failure. In this instance, the robotic device may power down if it is determined that that the belt needs to be replaced.

By way of example, an error associated with position control may allow the robotic device to complete the given operation but still produce a detectable sound by the microphone. By determining that the detected sounds differ from expected sounds during one or more robot operations, one or more processors may adjust that control data associated with position control in order to improve the performance of the robotic device.

Referring back to FIG. 3, as shown by block 310, method 300 includes adjusting control data for the at least one component of the robotic device. In one instance, the component may be an actuator coupled to the robotic link 210 of the robotic device 200. In this instance, adjusting the control data may involve powering down the actuator coupled to the robotic link 210 until further investigation is completed to determine what may be causing an error. By way of example, the control data for the actuator may include one or more values associated with at least one of position control, velocity control, and current control.

Figure 6B:
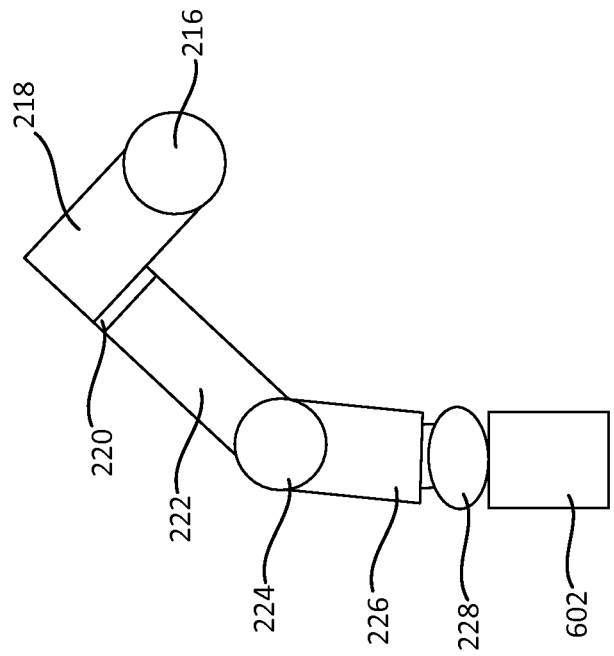
FIGS. 6A & 6B illustrate different positions of a portion of a robotic device, according to an example embodiment.
Figure 6A:
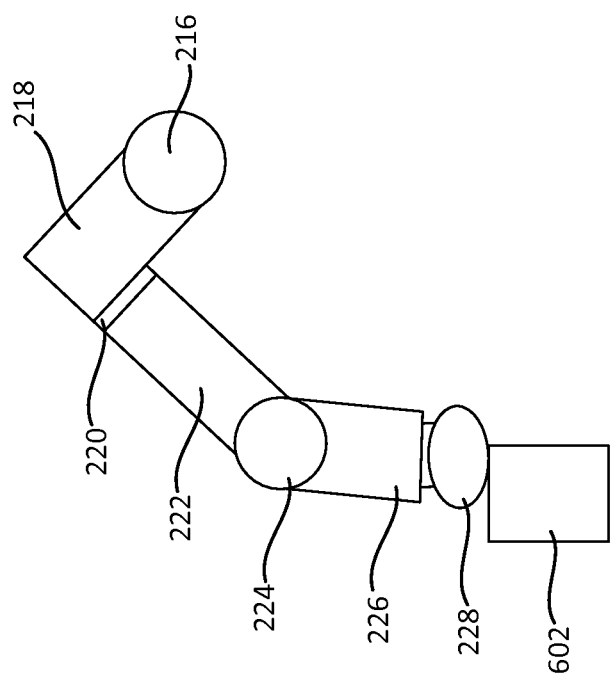

FIGS. 6A and 6B illustrate different positions of a portion of robotic device 200 from FIG. 2.

FIG. 6A illustrates an example portion of robotic device 200 attempting to lift object 602 with suction gripper 228. As the suction gripper 228 makes improper contact (e.g., aligned incorrectly) with the object 602, a sound may be detected by at least one audio sensor of the robotic device 200. Based on a determined difference between the detected sound profile and an expected sound profile, one or more processors may determine an error associated with one or more image sensors of the robotic device during the given operation. A signal to stop the given operation may be provided to one or more components of the robotic device 200. In one example, the difference between detected sound and the expected sound may be a hissing sound that occurs due to a vacuum leak between a suction gripper and an object. The hissing sound may serve to determine that the suction gripper is misaligned. In this example, the misalignment of the suction gripper may be caused by an incorrectly calibrated vision system which results in the detected hissing sound.

Once the robotic device 200 has been stopped, control data associated with one or more image sensors (e.g., a camera coupled to the robotic device) may be adjusted. For instance, the one or more image sensors may be instructed to refocus on a different plane based on adjustments to control data associated with the one or more image sensors. Refocusing on a different plane may be achieved by adjusting one or more values corresponding to at least one of pan, tilt, or zoom of the image sensor. In this instance, this would allow the robotic device 200 to make an adjustment to the given operation in order to make proper contact with the object 602 as shown in FIG. 6B.

As mentioned above, determining the expected sound profile may also include determining a plurality of sounds that correspond to a plurality of material types. In one example, one or more computing devices may determine that a detected sound, during an operation of the robotic device, correlates with a particular sound of the plurality of sounds corresponding to the plurality of material types. For instance, the robotic device 100 may determine that the detected sound of a rod corresponds to a material type of glass as the robotic manipulator 134 makes contact with the rod. Prior to detection, in this instance, the robotic device may have been instructed to handle one or more rods made out of plastic and thereby apply a specific amount of force when handling the one or more plastic rods. Based on the correlation, the one or more computing devices may be configured to adjust control data of an end effector according to the corresponding material type. For example, control data associated with the amount of force exerted by the robotic manipulator 134 may be adjusted so that the robotic manipulator 134 is capable of lifting the glass rod without dropping the glass rod.

In another example, the one or more computing devices may provide the sensor data for detected sounds associated with the given operation to a remote server. The remote server may be a cloud based server that analyzes the sensor data in order to assist with adjustment of control data. For instance, the cloud based server may use a probabilistic model to determine a weight of one or more adjustments to the control data. The probabilistic model may take into consideration various operating conditions such as how long the robotic device has been operating in addition to multiple temperature readings when weighing the one or more adjustments.

Based on the provided sensor data of the detected sound to the remote server, the robotic device may receive one or more commands for adjusting the control data for the at least one component. In one scenario, the cloud based server may also help to identify the component that is causing the sound. One or more commands may be received by the communication system 120 of robotic device 100. In one example, the robotic device 100 may conserve power by offloading the processing associated with determining one or more commands for adjusting the control data. This may be beneficial for a robotic device that is configured to operate in various environments without quick access to a source of energy for the robotic device.

In another example, based on the determined differences between detected sounds and expected sounds, a computing device may identify a particular error associated with the operation. In this example, if the error is determined to be an electrical error, then one or more electrical components of the robotic device, associated with the operation, may be analyzed to determine if any replacements of the one or more electrical components are needed. Further, the computing device may provide, to a computing device located remotely from the robotic device, information indicative of the determined error. By way of example, the remote computing device may be a mobile device such as a cellular phone, laptop, tablet, etc. In this example, an individual responsible for the robotic device may receive the information indicative of the determined error and take action to resolve the error.

Figure 7:
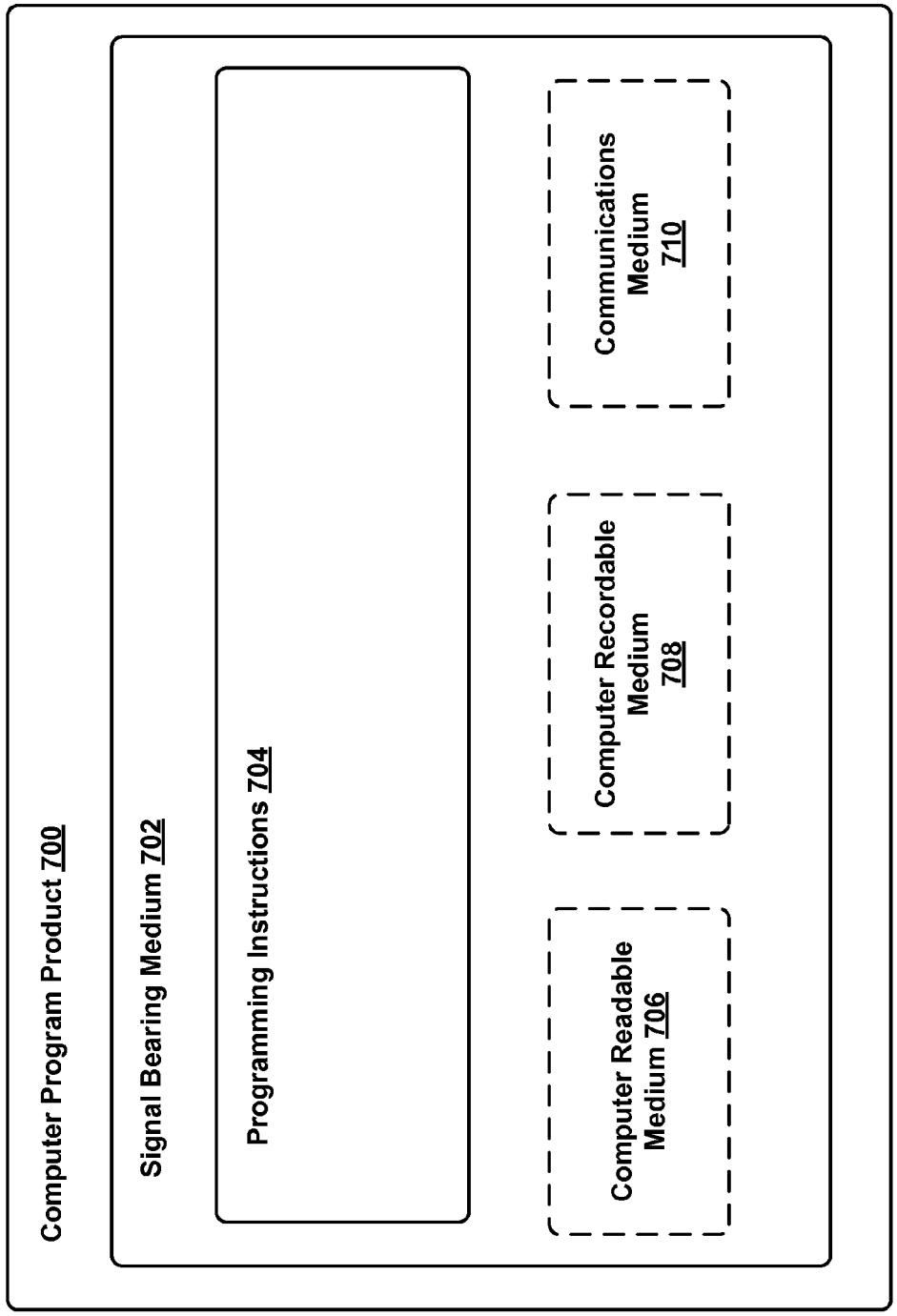
FIG. 7 depicts an example computer readable medium configured according to an example embodiment.

FIG. 7 depicts an example computer readable medium configured according to an example embodiment. In example embodiments, an example system may include one or more processors, one or more forms of memory, one or more input devices/interfaces, one or more output devices/interfaces, and machine readable instructions that when executed by the one or more processors cause the system to carry out the various functions tasks, capabilities, etc., described above.

As noted above, in some embodiments, the disclosed techniques (e.g., functions of the robotic device 100, robotic device 200, method 300, etc.) may be implemented by computer program instructions encoded on a computer readable storage media in a machine-readable format, or on other media or articles of manufacture. FIG. 7 is a schematic illustrating a conceptual partial view of an example computer program product that includes a computer program for executing a computer process on a computing device, arranged according to at least some embodiments disclosed herein.

In one embodiment, the example computer program product 700 is provided using a signal bearing medium 702. The signal bearing medium 702 may include one or more programming instructions 704 that, when executed by one or more processors may provide functionality or portions of the functionality described above with respect to FIGS. 1-6. In some examples, the signal bearing medium 702 may be a computer-readable medium 706, such as, but not limited to, a hard disk drive, a Compact Disc (CD), a Digital Video Disk (DVD), a digital tape, memory, etc. In some implementations, the signal bearing medium 702 may be a computer recordable medium 708, such as, but not limited to, memory, read/write (R/W) CDs, R/W DVDs, etc. In some implementations, the signal bearing medium 702 may be a communication medium 710 (e.g., a fiber optic cable, a waveguide, a wired communications link, etc.). Thus, for example, the signal bearing medium 702 may be conveyed by a wireless form of the communications medium 710.

The one or more programming instructions 704 may be, for example, computer executable and/or logic implemented instructions. In some examples, a computing device may be configured to provide various operations, functions, or actions in response to the programming instructions 704 conveyed to the computing device by one or more of the computer readable medium 706, the computer recordable medium 708, and/or the communications medium 710.

The computer readable medium 706 may also be distributed among multiple data storage elements, which could be remotely located from each other. The computing device that executes some or all of the stored instructions could be an external computer, or a mobile computing platform, such as a smartphone, tablet device, personal computer, wearable device, etc. Alternatively, the computing device that executes some or all of the stored instructions could be remotely located computer system, such as a server.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
receiving an expected sound profile corresponding to a given task for a robotic device from a remote server that aggregates detected sound profiles during performance of the given task by a plurality of other robotic devices;
detecting, based on sensor data from at least one audio sensor associated with the robotic device, a sound profile during execution of the given task by the robotic device;
determining one or more differences in amplitude for at least one frequency range between the detected sound profile and the expected sound profile corresponding to the given task for the robotic device;
in response to determining the one or more differences in amplitude for the at least one frequency range between the detected sound profile and the expected sound profile corresponding to the given task for the robotic device, identifying at least one component of the robotic device associated with the detected sound profile during execution of the given task;
providing the detected sound profile during execution of the given task by the robotic device to the remote server;
based on the provided detected sound profile, receiving one or more commands from the remote server for adjusting control data for the at least one component; and
adjusting the control data for the at least one component of the robotic device.

2. The method of claim 1, wherein the expected sound profile comprises an amplitude of sound in the at least one frequency range over a time domain.

3. The method of claim 1, wherein the expected sound profile comprises one or more wavelets over a frequency domain, wherein the frequency domain comprises the at least one frequency range.

4. The method of claim 1, wherein the expected sound profile comprises a plurality of expected sounds corresponding to contact between the robotic device and a plurality of material types.

5. The method of claim 4, further comprising:
determining that the detected sound profile correlates with a particular sound of the plurality of expected sounds corresponding to the plurality of material types; and
based on the correlation, adjusting control data of an end effector of the robotic device according to a material type corresponding to the particular sound.

6. The method of claim 1, further comprising:
determining that the given task is associated with control of a suction gripper of the robotic device;
based on the one or more differences in amplitude for the at least one frequency range between the detected sound profile and the expected sound profile, identifying an error associated with one or more image sensors of the robotic device during the given task; and
adjusting positioning of the suction gripper based on the identified error associated with the one or more image sensors of the robotic device.

7. A non-transitory computer-readable medium having stored thereon program instructions that when executed by a computing device, cause the computing device to perform functions comprising:
receiving an expected sound profile corresponding to a given task for a robotic device from a remote server that aggregates detected sound profiles during performance of the given task by a plurality of other robotic devices;
detecting, based on sensor data from at least one audio sensor associated with the robotic device, a sound profile during execution of the given task by the robotic device;
determining one or more differences in amplitude for at least one frequency range between the detected sound profile and the expected sound profile corresponding to the given task for the robotic device;
in response to determining the one or more differences in amplitude for the at least one frequency range between the detected sound profile and the expected sound profile corresponding to the given task for the robotic device, identifying at least one component of the robotic device associated with the detected sound profile during execution of the given task;
providing the detected sound profile during execution of the given task by the robotic device to the remote server;
based on the provided detected sound profile, receiving one or more commands from the remote server for adjusting control data for the at least one component; and
adjusting the control data for the at least one component of the robotic device.

8. The non-transitory computer-readable medium of claim 7, wherein the expected sound profile comprises an amplitude of sound in the at least one frequency range over a time domain, the functions further comprising:
determining the one or more differences in amplitude for the at least one frequency range between the detected sound profile and the expected sound profile at corresponding times during execution of the given task.

9. The non-transitory computer-readable medium of claim 7, wherein the at least one component of the robotic device comprises one or more actuators.

10. The non-transitory computer-readable medium of claim 9, wherein adjusting the control data for the one or more actuators comprises causing the one or more actuators to power down.

11. The non-transitory computer-readable medium of claim 9, wherein the control data for the one or more actuators comprises one or more values associated with at least one of position control, velocity control, and current control.

12. A robotic device comprising:
one or more audio sensors, wherein the one or more audio sensors are configured to detect sounds associated with operation of the robotic device;
one or more processors; and
data storage comprising instructions executable by the one or more processors to cause the robotic device to perform operations comprising:
receiving an expected sound profile corresponding to a given task for the robotic device from a remote server that aggregates detected sound profiles during performance of the given task by a plurality of other robotic devices;
detecting, based on sensor data from the one or more audio sensors, a sound profile during execution of the given task by the robotic device;
determining one or more differences in amplitude for at least one frequency range between the detected sound profile and the expected sound profile corresponding to the given task for the robotic device;
in response to determining the one or more differences in amplitude for the at least one frequency range between the detected sound profile and the expected sound profile corresponding to the given task for the robotic device, identifying at least one component of the robotic device associated with the detected sound profile during execution of the given task;

providing the detected sound profile during execution of the given task by the robotic device to the remote server;

based on the provided detected sound profile, receiving one or more commands from the remote server for adjusting control data for the at least one component; and adjusting the control data for the at least one component of the robotic device.

13. The robotic device of claim 12, wherein the at least one component of the robotic device comprises one or more sensors associated with image capture.

14. The robotic device of claim 13, wherein adjusting the control data for the one or more sensors associated with image capture further comprises:

adjusting one or more values corresponding to image quality.

15. The robotic device of claim 13, wherein adjusting the control data for the one or more sensors associated with image capture further comprises:

adjusting one or more values corresponding to at least one of pan, tilt, or zoom.

16. The robotic device of claim 12, the operations further comprising:

based on the one or more differences in amplitude for at least one frequency range between the detected sound profile and the expected sound profile corresponding to the given task for the robotic device, determining an error associated with execution of the given task; and providing, to a computing device located remotely from the robotic device, information indicative of the determined error.

* * * * *